United States Patent
Arsego et al.

(10) Patent No.: US 11,549,607 B2
(45) Date of Patent: Jan. 10, 2023

(54) PRESSURE REGULATOR FOR GAS DISTRIBUTION SYSTEM AND PILOT DEVICE FOR PILOTING PRESSURE REGULATORS

(71) Applicant: Pietro Fiorentini S.P.A., Arcugnano (IT)

(72) Inventors: Alberto Arsego, Torri Di Quartesolo (IT); Michele Bernardi, Selvazzano Dentro (IT); Alessandro Bonamico, Padua (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 0 days.

(21) Appl. No.: 17/275,854

(22) PCT Filed: Oct. 22, 2019

(86) PCT No.: PCT/IB2019/059010
§ 371 (c)(1),
(2) Date: Mar. 12, 2021

(87) PCT Pub. No.: WO2020/084484
PCT Pub. Date: Apr. 30, 2020

(65) Prior Publication Data
US 2022/0057014 A1 Feb. 24, 2022

(30) Foreign Application Priority Data

Oct. 23, 2018 (IT) .................. 102018000009698
Jun. 21, 2019 (IT) .................. 102019000009765

(51) Int. Cl.
*F16K 31/38* (2006.01)
*F16K 31/126* (2006.01)
*G05D 16/06* (2006.01)

(52) U.S. Cl.
CPC ............ *F16K 31/38* (2013.01); *F16K 31/126* (2013.01); *G05D 16/0672* (2013.01); *Y10T 137/7805* (2015.04)

(58) Field of Classification Search
CPC .......... G05D 16/0672; G05D 16/0697; G05D 16/163; Y10T 137/7796; Y10T 137/7798;
(Continued)

(56) References Cited

U.S. PATENT DOCUMENTS 757,881 A * 4/1904 Burke ................ G05D 16/0672
137/505.22
1,729,820 A * 10/1929 Campbell .......... G05D 16/0672
137/508
(Continued)

FOREIGN PATENT DOCUMENTS

FR      2 057 640 A5    5/1971
WO    2016/132300 A1    8/2016

OTHER PUBLICATIONS

International Search Report and Written Opinion dated Mar. 25, 2020, issued in PCT Application No. PCT/IB2019/059010, filed Oct. 22, 2019.

*Primary Examiner* — William M McCalister
(74) *Attorney, Agent, or Firm* — Workman Nydegger (57) ABSTRACT

A pressure regulator for gas distribution systems includes: a connection body for connection between an upstream pipe and a downstream pipe, the following elements being defined inside the connection body: an inlet duct an outlet duct, a high-pressure chamber connected to the inlet duct, a low-pressure chamber connected to the outlet duct, a passage opening between the high-pressure chamber and the low-pressure chamber, a movable shutter designed to obstruct the passage opening, components for moving the
(Continued)

movable shutter in a controlled manner. The components for moving the movable shutter in a controlled manner include: a first main control head fixed to the connection body and configured to operate the movable shutter through a first control rod, a second auxiliary control head configured to operate the movable shutter through a second control rod fixed to the same movable shutter.

9 Claims, 4 Drawing Sheets

(58) Field of Classification Search
CPC ......... Y10T 137/7801; Y10T 137/7805; F16K 31/38; F16K 31/126
USPC ............ 137/505.13, 505.15, 505.18, 505.22

See application file for complete search history.

(56) References Cited

U.S. PATENT DOCUMENTS

| | | | | | |
|---|---|---|---|---|---|
| 2,026,704 | A | * | 1/1936 | Petroe | G05D 16/0672 137/505.22 |
| 2,162,779 | A | * | 6/1939 | Leutwiler | G05D 16/0672 137/505.22 |
| 2,226,761 | A | * | 12/1940 | Fox | G05D 16/0663 236/80 R |
| 2,731,026 | A | * | 1/1956 | Georgec | G05D 16/0694 137/505.46 |
| 2,747,599 | A | * | 5/1956 | Watson | F16K 24/06 137/116.5 |
| 2,960,107 | A | * | 11/1960 | Falconer | G05D 16/0672 137/484.2 |
| 3,001,535 | A | * | 9/1961 | Mueller | G05D 16/0672 137/51 |
| 3,557,831 | A | * | 1/1971 | Katchka | G05D 16/0672 137/613 |
| 2008/0251146 | A1 | * | 10/2008 | Folk | F16K 31/1262 137/12 |

* cited by examiner

PRESSURE REGULATOR FOR GAS DISTRIBUTION SYSTEM AND PILOT DEVICE FOR PILOTING PRESSURE REGULATORS

BACKGROUND OF THE INVENTION

1. The Field of the Invention

The present invention concerns a pressure regulator for gas distribution systems.

The subject of the present invention includes also a pilot device for piloting pressure regulators for gas distribution systems.

The subject of the present invention includes also a pressure regulation unit for gas distribution systems.

2. The Relevant Technology

Nowadays it is known that natural gas distribution networks comprise pressure regulation stations in which the gas pressure is reduced from a feeding value to a delivery value necessary to serve the users connected to the network in an optimal manner.

The above-mentioned lowering of the pressure value is obtained by means of pressure regulators which serve the function of maintaining the delivery pressure at a predefined setting value, independently of the flow rate of natural gas supplied.

A pressure regulator for gas distribution systems generally comprises a connection body for connection between an upstream pipe and a downstream pipe, wherein inside the connection body there are an inlet duct, an outlet duct, a high-pressure chamber connected to the inlet duct, a low-pressure chamber connected to the outlet duct, a passage opening between the high-pressure chamber and the low-pressure chamber, a movable shutter designed to obstruct the passage opening and means for moving said movable shutter in a controlled manner.

The movement of the shutter determines a narrowing of the passage opening, in such a way as to cause a reduction in the gas pressure between the position upstream and the position downstream of the shutter itself.

The shutter is movable in such a way that the passage cross section and, therefore, the gas pressure drop can be modified according to the flow rate of the gas itself.

The movement of the shutter is obtained through controlled movement means comprising a feedback circuit which, in the case of a pressure increase in the supplied gas with respect to the regulator setting value, reduces the extent of opening of the passage opening, moving the shutter near it, while the contrary happens in the case of a pressure decrease.

The feedback is obtained by using a control head containing a motorization chamber as controlled movement means, said motorization chamber being delimited by a movable wall connected to the shutter and associated with a counter-thrust spring.

As long as the pressure in the motorization chamber is balanced with the force of the spring, the movable wall does not move.

In the presence of a pressure perturbation, the movable wall moves until a condition of balance is restored and causes a corresponding movement of the shutter.

According to a first known technique, the motorization chamber is directly placed in communication with a downstream pipe, at a point that is located downstream of the shutter, in such a way that the movable wall is subjected to the delivery pressure of the natural gas.

The movable wall is connected to the shutter in such a way that a reduction in the delivery pressure causes the shutter to open, thus restoring the initial pressure.

A pressure regulator of the type just described above is called a "direct acting" regulator in technical jargon, as the movable wall that controls the shutter is directly affected by the delivery pressure of the natural gas.

In this type of direct acting pressure regulators, the setting pressure is regulated by acting on the counter-thrust spring preload.

A similar direct acting pressure regulator provides a very quick response to pressure variations, since the delay is only the delay related to the mechanical inertia of the components of the regulator and to the time necessary for the propagation of the pressure perturbation from the outflow duct to the shutter chamber.

On the other hand, said direct acting pressure regulator has a relatively limited precision in regulation, due to the fact that the force of the spring is not uniform as its deformation varies.

Consequently, the gas pressure necessary to balance the spring force depends on the deformation of the latter and, therefore, on the position of the movable wall.

Therefore, the gas delivery pressure is not constantly equal to the setting pressure but differs from the latter according to the position of the shutter.

Said direct acting pressure regulator poses the further drawback of not allowing the remote modification of the setting pressure.

In fact, for safety reasons, said setting is carried out through an adjusting screw located on the pressure regulator, which modifies the degree of deformation of the spring in such a way as to vary the force its exerts with the shutter in the same position.

The fact that it is not possible to carry out a remote setting leads to the further drawback of requiring that said setting operation be performed on site, which involves the consequent labour costs.

According to a second known technique for controlling the pressure regulator, the pressure regulator is associated with an indirect feedback system based on the use of a device called "pilot" in technical jargon, said pilot device being configured to vary the pressure in the motorization chamber so that the delivery pressure of the natural gas is maintained at the setting value which has been set in the pilot device.

Compared to a direct acting pressure regulator, a pressure regulator with pilot device offers the advantage of allowing a more precise regulation of the gas delivery pressure.

Still advantageously, the setting of the pilot device can be modified remotely, as the safety requirements of the setting device are less stringent than those of the pressure regulator.

However, a pressure regulator with pilot device poses the drawback of having a longer response time compared to that of a system without pilot device, since in the case of a pressure regulator with pilot device the response time comprises also the reaction times of the pilot device.

A further drawback of the system just described above lies in that a malfunction of the pilot device makes it impossible to regulate the gas delivery pressure, thus limiting the reliability of the regulation system.

Furthermore, a pressure regulator with pilot device, though being suitable for applications in which a safety system of the 'fail close' type is required, meaning a system that in case of failure ensures that the movable shutter obstructs the passage opening completely, is not suited to be made in such a way as to provide a safety system of the 'fail open' type, meaning a system that in case of failure ensures that the movable shutter does not obstruct the passage opening but rather allows the gas to flow therethrough.

Another important drawback of the known technique is related to the pilot devices, which are generally set in a mechanical manner by means of a preloaded helical spring, wherein the preload in turn needs to be mechanically adjusted by acting manually on an adjusting screw that is part of the pilot device itself.

These pilot devices, even if widespread and appreciated, require a specific operation to be carried out on site by a specialized technician whenever it is necessary to modify the setting values of a pilot device and therefore the quality of the operation of the pressure regulator with which the pilot device is associated.

Furthermore, nowadays gas service providers increasingly feel the need to have at their disposal remote control and management systems that make it possible to control and govern all the components of a system remotely, including the pilot devices.

SUMMARY OF THE DISCLOSURE

The present invention intends to overcome all the drawbacks described above which are typical of the pressure regulators for gas distribution systems of the known type as well as of the pilot devices for piloting pressure regulators for gas distribution systems.

It is the main object of the present invention to provide a pressure regulator which combines the regulation reliability of a pilot controlled regulator with the quick response of a direct acting regulator.

It is also the object of the invention to provide a pressure regulator which can continue to operate like a direct acting regulator even in case of failure of the pilot device.

It is another object of the invention to provide a pressure regulator which can be easily equipped so as to obtain a 'fail open' safety system.

It is another main object of the present invention to provide a pilot device which is very flexible in terms of capacity to control the setting pressure and easy to adapt to the most varied applications.

It is another object of the invention to provide a pilot device which can be managed and controlled remotely with greater precision compared to the pilot devices of the known type.

It is another object of the invention to provide a pressure regulation unit for gas distribution systems which incorporates a pressure regulator according to the invention itself.

The tasks and the objects illustrated above are fulfilled by a pressure regulator for gas distribution systems according to claim 1, and by a pilot device according to claim 11.

Further characteristics of the pressure regulator according to claim 1 and of the pilot device according to claim 11 are described in the respective dependent claims.

BRIEF DESCRIPTION OF THE DRAWINGS

The tasks and the objects illustrated above, together with the advantages mentioned below, are highlighted in the description of an embodiment of the invention, which is provided by way of non-limiting example making reference to the attached tables, wherein.

DETAILED DESCRIPTION OF THE PREFERRED EMBODIMENTS

With reference to the figures mentioned above, a pressure regulator for gas distribution systems according to the invention is indicated as a whole by the numeral 10.

Said pressure regulator 10 comprises:
a connection body 11 designed to provide a connection between an upstream pipe T1 and a downstream pipe T2;
wherein the following elements are defined inside the connection body 11:
an inlet duct 12,
an outlet duct 13,
a high-pressure chamber 14 connected to the inlet duct 12,
a low-pressure chamber 15 connected to said outlet duct 13,
a passage opening 16 between the high-pressure chamber 14 and the low-pressure chamber 15,
a movable shutter 17 suited to obstruct the passage opening 16,
means for moving the movable shutter 17 in a controlled manner.

Figure 1:
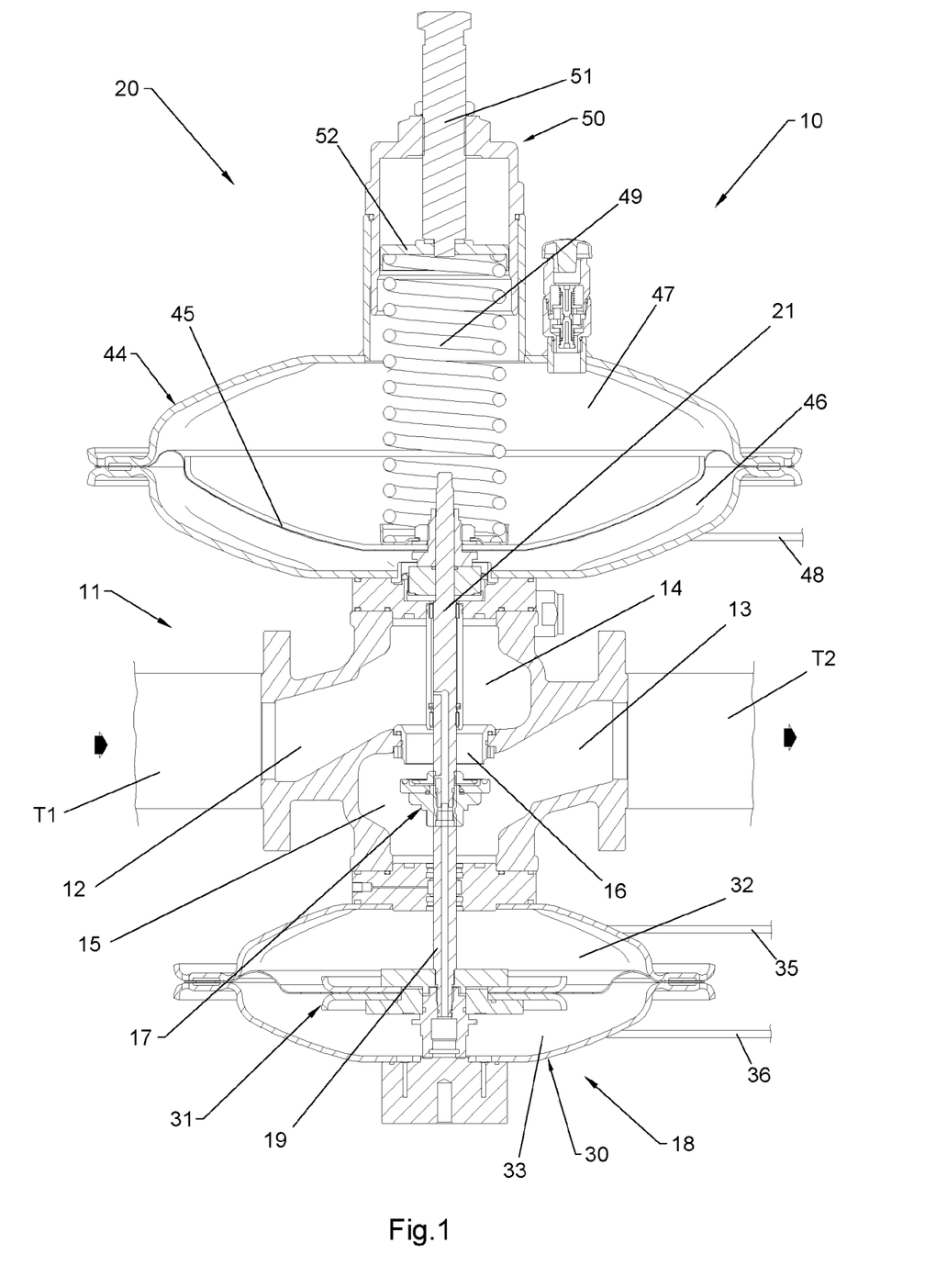
FIG. 1 shows a side sectional view of a pressure regulator according to the invention.
Figure 2:
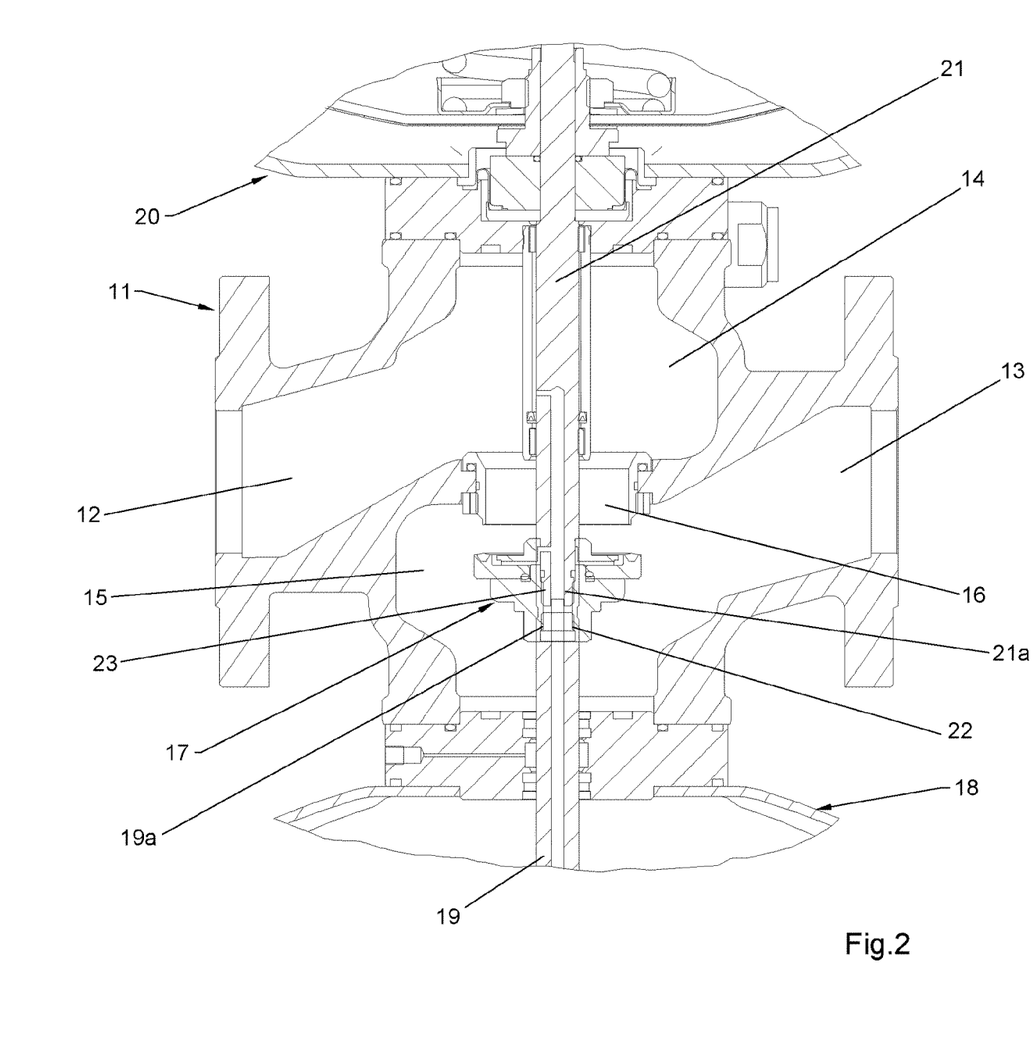
FIG. 2 shows a detail of FIG. 1.

Said movable shutter 17 is formed by a single body, as can be clearly seen in FIGS. 1 and 2.

Said single body of the movable shutter 17 must be intended as comprising a single component or several components fixed to one another in a rigid manner, that is, several components fixed to one another in such a way that they cannot move with respect to one another during the operation of the pressure regulator 10.

The special feature of the pressure regulator 10 according to the invention lies in that the means for moving the movable shutter 17 in a controlled manner comprise:
a first main control head 18 fixed to the connection body 11, said first control head 18 being configured to operate the movable shutter 17 through a first control rod 19 to which the movable shutter 17 is fixed,
a second auxiliary control head 20 configured to operate the movable shutter 17 through a second control rod 21 fixed to the same movable shutter 17.

The first control rod 19 must be intended as rigidly fixed to the movable shutter 17.

In the same way and at the same time, the second control rod 21, too, must be intended as rigidly fixed to the movable shutter 17, as clearly shown in FIGS. 1 and 2.

Thus, the movable shutter 17 is constituted by a single body and said first control rod 19 and second control rod 21 are fixed to the movable shutter 17 in a rigid manner.

In the present non-limiting example of embodiment of the invention, the second control head 20 is fixed to the connection body 11 on the opposite side with respect to the first control head 18.

The first control rod 19 and the second control rod 21 are arranged in such a way that they are coaxial with each other.

Alternatively, said first control rod 19 and second control rod 21 are arranged in such a way that they are parallel to and not coaxial with each other.

In the present example of embodiment, the first control rod 19 is fixed to the shutter 17 through a threaded end 19a which is screwed in a corresponding counter-threaded hole 22 defined in the body of the shutter 17.

Analogously, the second control rod 21 is fixed to the shutter 17 through a threaded end 21a which is screwed in a corresponding counter-threaded hole 23 defined in the body of the shutter 17.

In a variant embodiment of the invention, not illustrated for the sake of simplicity, the first control rod 19 and the second control rod 21 are part of a single control rod to which the shutter is fixed and which passes through the same shutter.

At least one of the control heads 18 and 20, respectively first and second, is of the pilot controlled type.

At least one of the control heads 18 and 20, respectively first and second, is of the directly controlled type.

For example, but without limitation, the first control head 18 is of the pilot controlled type.

Again, for example, the second control head 20 is of the directly controlled type.

In a variant embodiment of the invention, the first control head 18 and the second control head 20 are both of the pilot controlled type.

In a further variant embodiment of the invention, the first control head 18 and the second control head 20 are of the directly controlled type.

In the present example of embodiment, the first control head 18 comprises a shell 30, inside which there is a movable wall 31 fixed along the perimeter of the shell 30 and to the centre of the first control rod 19.

The movable wall 31 divides the inside of the shell 30 in two chambers, a motorization chamber 32 and a balance chamber 33.

In said example of embodiment, the first control head 18 is of the pilot controlled type.

It should be understood that said first control head 18 can even be of the directly controlled type, as already specified above.

Figure 3:
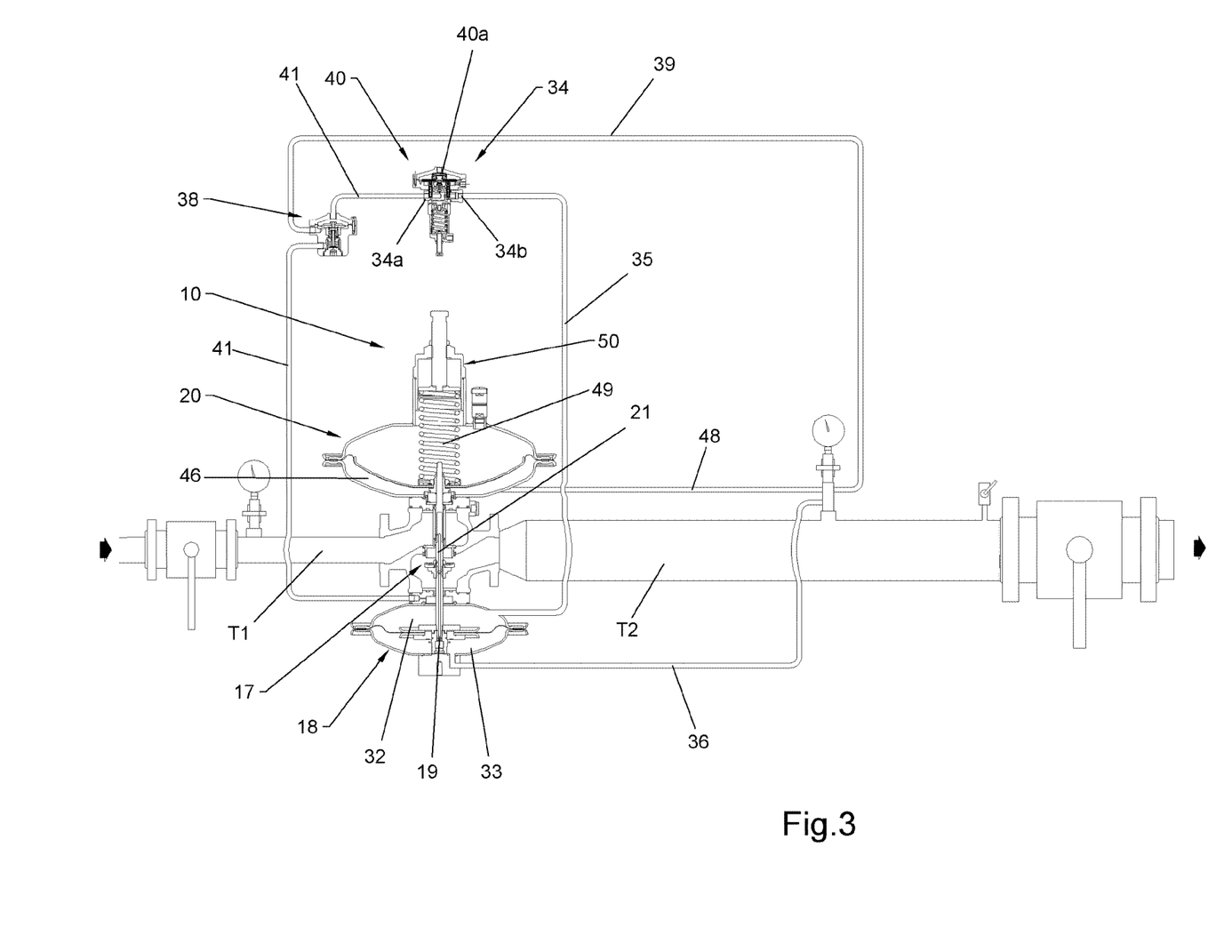
FIG. 3 shows a pressure regulation unit comprising a pressure regulator according to the invention.

The motorization chamber 32 is connected to a pilot device 34 through a motorization line 35, as clearly visible in the diagram of FIG. 3.

The balance chamber 33 is connected to the downstream pipe T2 through an impulse line 36.

The second control head 20 comprises a shell 44, inside which there is a movable wall 45 fixed along the perimeter of the shell 44 and to the centre of the second control rod 21.

The movable wall 45 divides the inside of the shell 44 in two chambers, a motorization chamber 46 and a balance chamber 47.

In said example of embodiment, the second control head 20 is of the directly controlled type.

It should be understood that said first control head 20 can even be of the pilot controlled type, as already specified above.

The motorization chamber 46 is connected to the downstream pipe T2 through an impulse line 48, as clearly visible in the diagram of FIG. 3.

The balance chamber 47 is provided with a setting spring 49.

Said second control head 20 carries out the regulation through a comparison between the load of the setting spring 49 and the thrusting action on the movable wall 45 deriving from the downstream pressure.

The setting spring 49 is constituted, as known, by a helical spring interposed between the movable wall 45 and a spring-pressing cap 50 so as to exert a thrusting action.

The spring-pressing cap 50 comprises a setting screw 51 positioned in such a way that it passes through the spring-pressing cap 50, and a supporting disc 52, on which the setting spring 49 rests; the position of the supporting disc 52 in the direction defined by the axis of the setting spring 49, and thus the degree of compression of the setting spring 49, is determined by the extent to which the setting screw 51 is screwed.

In the present non-limiting example of embodiment of the invention, in order to obtain a 'fail open' safety system, the shutter 17 is positioned on the second control rod 21 of the second control head 20 of the directly controlled type, in such a way that the extension of the setting spring 49 of the second control head 20 itself causes the shutter 17 to move away from the passage opening 16.

More specifically, the setting spring 49 is positioned in such a way as to push the movable wall 45 of the second control head 20 towards the connection body 11, and the movable shutter 17 is fixed to the second control rod 21 on the opposite side of the passage opening 16 with respect to the second control head 20 itself.

Figure 4:
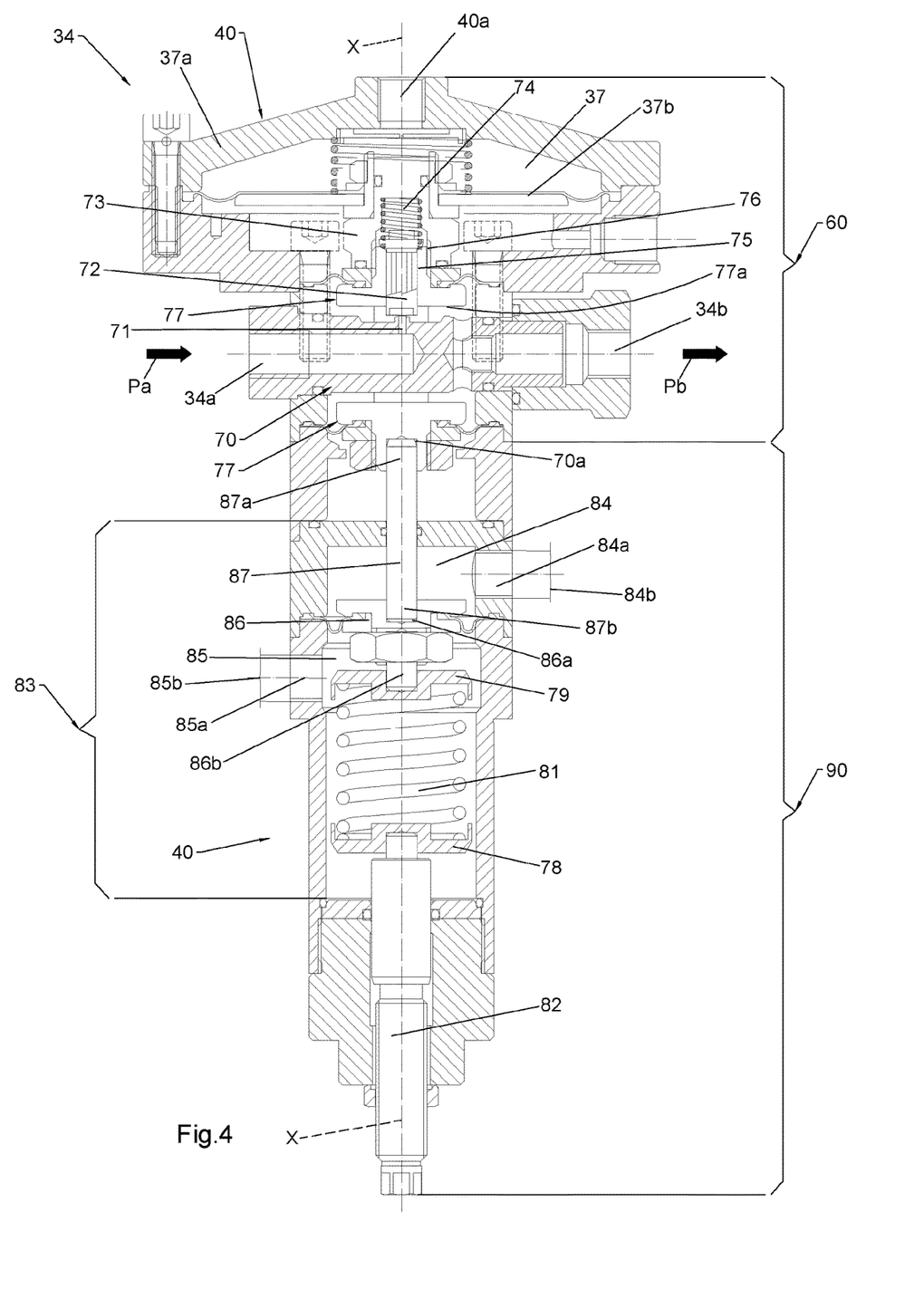
FIG. 4 shows a pilot device used in a pressure regulation unit according to the invention.

By way of non-limiting example of the invention, the pilot device 34 comprises an input mouth 34a, an output mouth 34b and regulation means 40 configured to reduce the pressure in a controlled manner from an input value Pa to an output value Pb, which is lower than Pa.

Said regulation means 40 have a motorization chamber 37 provided with an impulse mouth 40a.

The input mouth 34a of the pilot device 34 is connected to the upstream pipe T1 through a drawing line 41, of the type known per se, for example through the interposition of a pre-regulator 38 that must be intended as a regulator of the known type, too.

The output mouth 34b is connected to the motorization chamber 32 of the first control head 18.

The impulse mouth 40a is connected to the downstream pipe T2 through a piloting line 39; any pressure pulses located downstream, meaning in the pipe T2, are transmitted directly to the regulation means 40 of the pilot device 34 through said piloting line 39.

The subject of the invention includes also a pilot device 34 designed to pilot pressure regulators for gas distribution systems.

Said pilot device 34 comprises, as already mentioned above, an input mouth 34a, an output mouth 34b and regulation means 40, described in greater detail below, which are configured to reduce the pressure in a controlled manner from an input value Pa, at the input mouth 34a, to an output value Pb, which is lower than Pa, at the output mouth 34b.

The input mouth 34a of the pilot device 34 is suited to be connected to the upstream pipe T1 through a drawing line 41 of the type known per se.

For example, the input mouth 34a of the pilot device 34 is connected to the upstream pipe T1 through a drawing line 41 of the type known per se, for example through the interposition of a pre-regulator 38 to be intended as being of the known type, too.

The output mouth 34b is suited to be connected to the motorization chamber 32 of the first control head 18.

For example, the output mouth 34b is connected to the motorization chamber 32 of the first control head 18.

The regulation means 40 comprise a pilot head 60 with a motorization chamber 37 defined therein.

Preferably, the motorization chamber 37 is defined between a cover 37a of the pilot head 60 and a movable wall 37b.

Still preferably, the cover 37a is provided with an impulse mouth 40a from which a control fluid flows in.

The impulse mouth 40a is connected to the downstream pipe T2 through a piloting line 39; any pressure pulses located downstream, meaning in the pipe T2, are transmitted directly to the regulation means 40 of the pilot device 34 through said piloting line 39.

The regulation means 40 comprise:
- a pressure reducing valve 70 positioned between the input mouth 34a and the output mouth 34b, said pressure reducing valve 70 comprising a passage hole 71 that connects the input mouth 34a and the output mouth 34b,
- a shutter 72 for said passage hole 71, said shutter 72 being movable in the direction defined by the main axis X of the pilot device 34,
- a shutter-holding body 77; said shutter-holding body 77 extends in the direction defined by the main axis X; said shutter-holding body 77 has an axial through hole shaped so that it accommodates the shutter 72, and a transverse opening 77a in which the pressure reducing valve 70 is inserted,
- an annular guide and centering body 73 interposed between the movable wall 37b and the shutter-holding body 77; said annular guide and centering body 73 is provided with an axial cavity 76 in which there are a counteracting spring 74 for the shutter 72 and a joining collar 75 of the shutter-holding body 77 of the shutter 72, wherein said shutter 72 can translate axially in the axial cavity 76.

The regulation means 40 comprise, inside a containment casing 90, a spring setting unit 80, in turn comprising:
- a helical spring 81,
- an adjusting screw 82 for the direct mechanical adjustment of the compression of the spring 81,
- and a fluid-dynamic system 83 for the remote regulation of the setting pressure of the pilot device 34.

The special feature of said pilot device 34 lies in that the fluid-dynamic remote adjustment system 83 comprises two independent setting chambers, a first setting chamber 84 and a second setting chamber 85, divided by a movable wall 86 connected to the shutter through a thrust element 87, the first setting chamber 84 and the second setting chamber 85 being configured in such a way that each of them determines a pressure thrust on the movable wall 86 in one of the two opposite senses of the same direction X.

A difference in pressure between the first chamber 84 and the second chamber 85 determines a variation in the setting pressure of the pilot device 34.

The first setting chamber 84 has a first loading mouth 84a of its own, connected to a first remote control line 84b for the transit of a pressurized fluid.

Analogously, the second setting chamber 85 has a second loading mouth 85a of its own, connected to a second remote control line 85b.

In the present example of embodiment of the pilot device 34, the helical spring 81 is positioned in such a way as to operate inside the second setting chamber 85.

The thrusting element 87 comprises a small bar.

Preferably, the thrusting element 87 is constituted by a small bar.

The thrusting element 87 is positioned with a first one of its ends 87a inserted in a corresponding first seat 70a defined on the shutter-holding body 77 and with its second opposite end 87b inserted in a corresponding second seat 86a defined in the movable wall 86.

The ends 87a and 87b of the thrusting element 87 are simply inserted and not fixed in the respective first seat 70a and second seat 86a.

The expression 'simply inserted' means that each end of the thrusting element can translate in the respective first or second seat.

Said helical spring 81 is positioned coaxially with the thrusting element 87.

The helical spring 81 is pressed between two small plates, respectively 78 and 79.

A first small plate 78 is in direct contact with the adjusting screw 82.

The second small plate 79 is coupled with a projection 86b of the movable wall 86.

Two possible modes of use for the remote modification of the setting pressure of the pilot device 34 are described below, said modes being such that it is not necessary to act on the adjusting screw 82 of the helical spring 81.

According to a first mode of use, the helical spring 81 is preset through the adjusting screw 82 and one of the following operations is successively performed:
- introducing a pressurized fluid, for example a gas, in the second setting chamber 85 through the second remote control line 85b, in such a way as to increase the setting pressure of the pilot device 34,
- introducing a pressurized fluid, for example a gas, in the first setting chamber 84 through the first remote control line 84b, in such a way as to reduce the setting pressure of the pilot device 34.

According to a second mode of use, the helical spring 81 is preset through the adjusting screw 82, both the first setting chamber 84 and the second setting chamber 85 are remotely pre-pressurized and then one of the following operations is carried out:
- draining some fluid from the first chamber 84 through the first remote control line 84b, thus reducing the pressure in the first chamber 84 in order to increase the setting pressure of the pilot device 34,
- conveying other fluid into the second chamber 85 through the second remote control line 85a, thus increasing the pressure in the second chamber 85 in order to increase the setting pressure of the pilot device 34,
- conveying other fluid into the first chamber 84 through the first remote control line 84b, thus increasing the pressure in the first chamber 84 in order to reduce the setting pressure of the pilot device 34,
- draining some fluid from the second chamber 85 through the second remote control line 85a, thus reducing the pressure in the second chamber 85 in order to reduce the setting pressure of the pilot device 34.

The above shows that the setting pressure of the pilot device 34 can be controlled and modified by regulating the difference in pressure between the first setting chamber 84 and the second setting chamber 85.

Such a pilot device 34 is thus very flexible in terms of capacity to control the setting pressure, being easy to adapt to the most varied applications.

Among other things, it is important to highlight that the pilot device 34 described above can constitute the subject of a claim per se, even if not in combination with the pressure regulator 10.

It should be understood that the subject of the invention comprises also a pressure regulation unit for gas distribution systems, as clearly represented in FIG. 3.

Said regulation unit comprises a pressure regulator 10 as described above, that is, according to the invention, an upstream pipe T1 and a downstream pipe T2.

In said regulation unit, the first control head 18 is of the pilot controlled type and its motorization chamber 32 is connected to a pilot device through a motorization line 35, as clearly visible in FIG. 3.

The balance chamber 33 of the first control head 18 is connected to the downstream pipe T2 through an impulse line 36.

More specifically, and for example, the pilot device can be constituted by a pilot device 34, which is the subject of the present invention, as described above.

Again, for example, the second control head 20 is of the directly controlled type.

It should be understood that, as already explained above, the second control head 20, too, can be of the pilot controlled type.

In the example in which the second control head 20 is of the directly controlled type, its motorization chamber 46 is connected to the downstream pipe T2 through an impulse line 48 and the balance chamber 47 has a setting spring 49.

Such a regulation unit incorporates the advantages of the pressure regulator 10 according to the invention and possibly the advantages of the pilot device 34, also carried out according to the invention.

It has practically been shown that the invention fulfils the set tasks and objects.

More specifically, the invention provides a pressure regulator which combines the regulation reliability of a pilot controlled regulator with the quick response provided by a direct acting regulator, thanks to the two, first and second, control heads 18 and 20 that both control the same shutter 17, one in a pilot controlled manner and the other in a directly controlled manner.

Furthermore, the invention provides a pressure regulator which can continue to operate as a direct acting regulator also in case of failure of a pilot device connected to the first control head 18 of the pilot controlled type, thanks to the direct mechanical connection between the second control head 20, of the directly controlled type, and the shutter 17.

Moreover, the invention provides a pressure regulator which can be easily equipped so as to obtain a 'fail open' safety system, as it is necessary and sufficient to position the shutter 17 on the second control rod 21 of the second control head 20 of the directly controlled type, in such a way that the extension of the setting spring 49 of the second control head 20 itself causes the shutter 17 to move away from the passage opening 16.

Even more specifically, the invention provides a pilot device which is very flexible in terms of capacity to control the setting pressure and easy to adapt to the most varied applications.

Furthermore, the invention provides a pilot device which can be managed and controlled remotely with greater precision compared to the pilot devices of the known type.

Finally, but equally important, the invention provides a pressure regulation unit for gas distribution systems which incorporates a pressure regulator according to the invention itself.

The invention conceived in this way can be subjected to several modifications and variants, all falling within the inventive concept disclosed herein; furthermore, all the details can be replaced by other technically equivalent elements.

In practice, any components and any materials can be used, provided that they are compatible with the intended use, and any shape and size can be selected, according to the needs and the state of the art.

Where the characteristics and techniques mentioned in any of the claims are followed by reference signs, it must be understood that these reference signs are used only for the purpose of making the claims easier to understand, and consequently these reference signs do not have any limiting effect on the interpretation of each element identified by way of example by the same reference signs.

The invention claimed is:

1. A pressure regulator for gas distribution systems, comprising:
    a connection body for connection between an upstream pipe and a downstream pipe,
    the following elements being defined inside said connection body:
    an inlet duct,
    an outlet duct,
    a high-pressure chamber connected to said inlet duct,
    a low-pressure chamber connected to said outlet duct,
    a passage opening between said high-pressure chamber and low-pressure chamber,
    a movable shutter designed to obstruct said passage opening,
    means for moving said movable shutter in a controlled manner, said means for moving said movable shutter in a controlled manner comprising:
    a first control head fixed to said connection body, said first control head being configured to operate said movable shutter through a first control rod to which said movable shutter is fixed, said first control head in turn comprising a shell inside which there is a movable wall fixed along the perimeter of said shell and at the centre of said first control rod, wherein said movable wall divides the inside of said shell in two chambers, a motorization chamber and a balance chamber, said motorization chamber being connected to a pilot device through a motorization line, said balance chamber being connected to a downstream pipe through an impulse line, said downstream pipe being connected to the outlet duct;
    a second control head configured to operate said movable shutter through a second control rod fixed to said movable shutter itself, said second control head in turn comprising a second shell inside which there is a second movable wall fixed along the perimeter of the second shell and at the centre of the second control rod, wherein said second movable wall divides the inside of the second shell in two chambers, a second motorization chamber and a second balance chamber, said motorization chamber of said second control head being connected to the downstream pipe through a second impulse line,
    wherein said movable shutter is constituted by a single body, said first control rod and second control rod being fixed to said movable shutter in a rigid manner.

2. The pressure regulator according to claim 1, wherein said second control head is fixed to said connection body on the opposite side with respect to said first control head.

3. The pressure regulator according to claim 1, wherein said first control rod and said second control rod are arranged so that they are coaxial with each other.

4. The pressure regulator according to claim 1, wherein at least one between said first control head and second control head is of the pilot controlled type.

5. The pressure regulator according to claim 1, wherein at least one between said first control head and second control head is of the directly controlled type.

6. The pressure regulator according to claim 1, wherein said first control head is of the pilot controlled type.

7. The pressure regulator according to claim 1, wherein said second control head is of the directly controlled type.

8. The pressure regulator according to claim 7, wherein said second balance chamber of the second control head is provided with a setting spring.

9. The pressure regulator according to claim 8, wherein said shutter is positioned on said second control rod of said second control head of the directly controlled type, in such a way that an extension of said setting spring of said second control head itself causes said shutter to move away from said passage opening.

* * * * *